United States Patent
Fausett et al.

(10) Patent No.: US 10,350,521 B2
(45) Date of Patent: Jul. 16, 2019

(54) FUEL SYSTEM ICE AND DEBRIS SEPARATOR (IDS) WITH PARTIAL FILTER SCREEN AND TORTUROUS PATH

(71) Applicant: United Technologies Corporation, Hartford, CT (US)

(72) Inventors: Taylor Fausett, San Diego, CA (US); David L. Ripley, San Diego, CA (US)

(73) Assignee: United Technologies Corporation, Farmington, CT (US)

( * ) Notice: Subject to any disclaimer, the term of this patent is extended or adjusted under 35 U.S.C. 154(b) by 163 days.

(21) Appl. No.: 14/761,252

(22) PCT Filed: Jan. 15, 2013

(86) PCT No.: PCT/US2013/021580
§ 371 (c)(1),
(2) Date: Jul. 15, 2015

(87) PCT Pub. No.: WO2014/112979
PCT Pub. Date: Jul. 24, 2014

(65) Prior Publication Data
US 2015/0352471 A1    Dec. 10, 2015

(51) Int. Cl.
*B01D 35/00*      (2006.01)
*B01D 29/11*      (2006.01)

(52) U.S. Cl.
CPC .......... *B01D 35/005* (2013.01); *B01D 29/114* (2013.01)

(58) Field of Classification Search
CPC .............................. B01D 35/005; B01D 29/114
USPC ......... 210/435, 439, 440, 443, 446, DIG. 13
See application file for complete search history.

(56) References Cited

U.S. PATENT DOCUMENTS

| | | | |
|---|---|---|---|
| 2,412,232 A | 12/1946 | Sutton | |
| 3,822,787 A | 7/1974 | Shaltis et al. | |
| 3,993,561 A * | 11/1976 | Swearingen | B01D 35/02 210/131 |
| 4,073,136 A | 2/1978 | Symon | |
| 4,201,044 A | 5/1980 | Dodd | |
| 4,498,525 A | 2/1985 | Smith | |
| 4,706,636 A | 11/1987 | Davis | |

(Continued)

FOREIGN PATENT DOCUMENTS

WO    2012135689    10/2012

OTHER PUBLICATIONS

EP search report for EP13872029 dated Feb. 9, 2016.
(Continued)

*Primary Examiner* — Madeline Gonzalez
(74) *Attorney, Agent, or Firm* — O'Shea Getz P.C.

(57) ABSTRACT

A filter includes an outlet from a container, the outlet transverse to said inlet and a filter screen within the container that partially surrounds the outlet. In a further embodiment of the foregoing embodiment, the filter screen prevents passage of particles greater in size than 40 to 6000 microns. In a further embodiment of any of the foregoing embodiments, the filter screen provides a pressure drop of less than 0.5 psi. In a further embodiment of any of the foregoing embodiments, the filter screen defines a tortuous path with a bypass there around. In a further embodiment of any of the foregoing embodiments, the filter screen is cylindrical and extends parallel to a length of said container.

18 Claims, 3 Drawing Sheets

(56) References Cited

U.S. PATENT DOCUMENTS

| | | | |
|---|---|---|---|
| 5,116,362 A | 5/1992 | Arline | |
| 5,124,052 A | 6/1992 | Hardaker | |
| 5,438,823 A | 8/1995 | Loxley | |
| 5,776,341 A | 7/1998 | Barnard | |
| 5,776,342 A * | 7/1998 | Hiranaga | B01D 27/005 210/442 |
| 5,924,445 A | 6/1999 | Ambrose | |
| 6,221,242 B1 * | 4/2001 | Deibel | B01D 27/005 210/133 |
| 6,237,322 B1 | 5/2001 | Rago | |
| 6,584,777 B1 | 6/2003 | Clarke | |
| 6,651,441 B2 | 11/2003 | Rewter | |
| 7,805,947 B2 | 10/2010 | Meulebhar | |
| 7,806,944 B2 | 10/2010 | Ryder | |
| 7,854,774 B2 | 12/2010 | Renninger | |
| 8,221,633 B2 | 7/2012 | Lam | |
| 2009/0134101 A1 | 5/2009 | Lee | |
| 2010/0288688 A1 * | 11/2010 | Bryson | B01D 27/103 210/254 |
| 2012/0181234 A1 | 7/2012 | Nydahl | |
| 2012/0279478 A1 | 11/2012 | Walters et al. | |
| 2013/0284651 A1 * | 10/2013 | Lin | B01D 35/16 210/188 |

OTHER PUBLICATIONS

Office action for for EP13872029.7 dated Oct. 17, 2017.
EPO Official Letter dated Jan. 21, 2019 for EP Application No. 13872029.7.

* cited by examiner

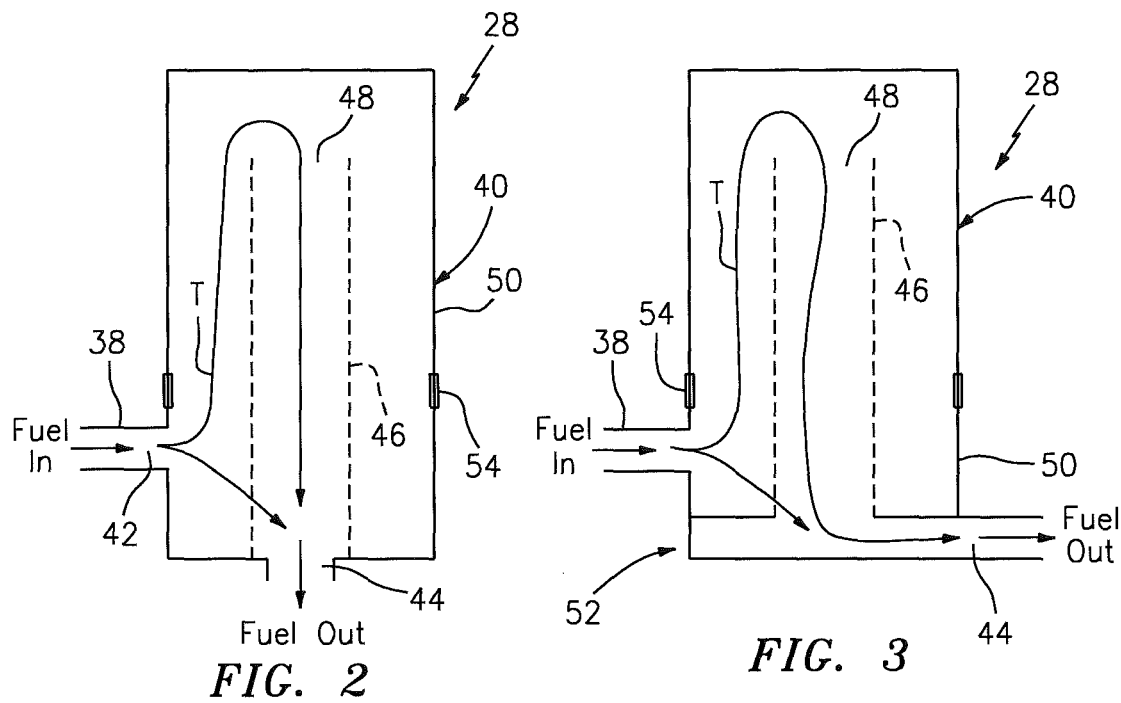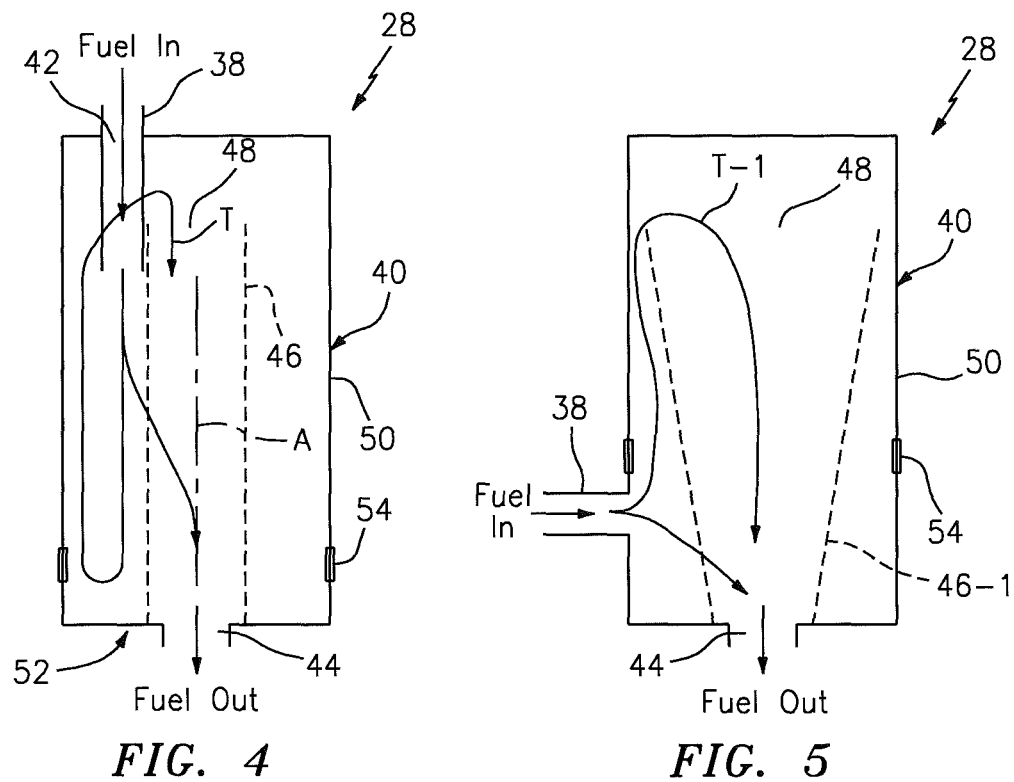

FUEL SYSTEM ICE AND DEBRIS SEPARATOR (IDS) WITH PARTIAL FILTER SCREEN AND TORTUROUS PATH

This application claims priority to PCT Patent Application No. PCT/US13/21580 filed Jan. 15, 2013, which is hereby incorporated by reference.

BACKGROUND

The present disclosure relates to a fuel system, and more particularly to an Ice and Debris Separator (IDS) therefor.

Aircraft fuel systems, because of the wide range of environmental conditions in which aircraft operate, may be susceptible to ice clogging. The ice, in rare instances, may lodge in servo valves and other calibrated fuel system components.

Conventional aircraft fuel system filters may be limited in ice management. Either the filter is fine enough to filter debris to a desired fine level and may be susceptible to a relatively significant pressure drop due to ice or the filter is designed with respect to ice and is inherently too coarse to filter debris to a desired level. Ice separators that rely solely on geometry to accomplish the separation of ice and debris with no filter screen may also be ineffective because of the wide range of fuel flow speeds typical of aircraft fuel systems.

Icing may not only be an issue for aircraft main engines, but may be an even more acute issue for aircraft Auxiliary Power Units (APUs) as APUs typically rest in flight at a no flow condition, may gather ice, then may suddenly be tasked with operation in a freezing condition.

SUMMARY

A filter according to one disclosed non-limiting embodiment of the present disclosure includes a container, an inlet to said container, an outlet from said container, and a filter screen within said container that partially surrounds said outlet.

In a further embodiment of the foregoing embodiment, the filter screen prevents passage of particles greater in size than 40 to 6000 microns.

In a further embodiment of any of the foregoing embodiments, the filter screen provides a pressure drop of less than 0.5 psi.

In a further embodiment of any of the foregoing embodiments, the filter screen defines a tortuous path with a bypass there around.

In a further embodiment of any of the foregoing embodiments, the filter screen is cylindrical and extends parallel to a length of said container.

In a further embodiment of any of the foregoing embodiments, the filter screen extends non-parallel to a length of said container.

In a further embodiment of any of the foregoing embodiments, the filter screen is transverse to said inlet.

In a further embodiment of any of the foregoing embodiments, the inlet is parallel to said outlet.

In a further embodiment of any of the foregoing embodiments, the inlet is transverse to said outlet.

In a further embodiment of any of the foregoing embodiments, the filter screen is transverse to said inlet and said inlet is parallel to said outlet.

In a further embodiment of any of the foregoing embodiments, the filter screen is transverse to said inlet and said inlet is transverse to said outlet.

In a further embodiment of any of the foregoing embodiments, the filter screen is parallel to said inlet and said inlet is parallel to said outlet. In the alternative or additionally thereto, in the foregoing embodiment the filter screen and said outlet are defined along a common axis.

A filter according to another disclosed non-limiting embodiment of the present disclosure includes a container, an inlet to said container, an outlet from said container, said outlet transverse to said inlet, and a filter screen within said container that partially surrounds said outlet.

In a further embodiment of the foregoing embodiment, the filter screen extends parallel to a length of said container.

In a further embodiment of any of the foregoing embodiments, the filter screen extends non-parallel to a length of said container.

In a further embodiment of any of the foregoing embodiments, the filter screen is transverse to said inlet.

A filter comprising according to another disclosed non-limiting embodiment of the present disclosure includes a container, an inlet to said container, an outlet from said container, said outlet parallel to said inlet, and a filter screen within said container that partially surrounds said outlet.

In a further embodiment of the foregoing embodiment, the filter screen is parallel to said inlet.

In a further embodiment of any of the foregoing embodiments, the filter screen and said outlet are defined along a common axis, said inlet offset from said axis.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 2 is an enlarged schematic sectional view of a filter according to one disclosed non-limiting embodiment;

FIG. 3 is an enlarged schematic sectional view of a filter according to another disclosed non-limiting embodiment;

FIG. 4 is an enlarged schematic sectional view of a filter according to another disclosed non-limiting embodiment;

FIG. 5 is an enlarged schematic sectional view of a filter according to another disclosed non-limiting embodiment.

DETAILED DESCRIPTION

Figure 1:
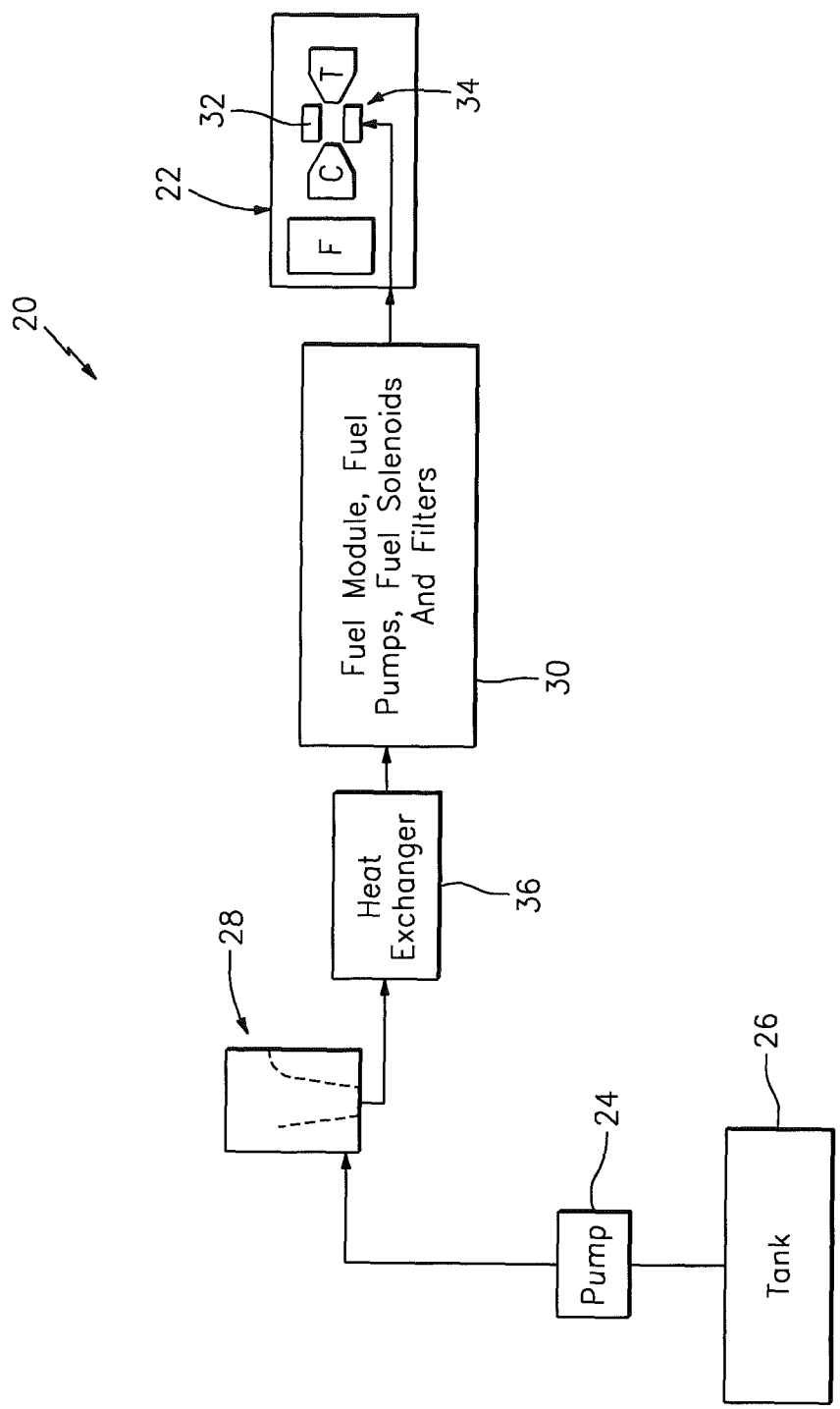
FIG. 1 is a schematic cross-section of a fuel system for a gas turbine engine.

FIG. 1 schematically illustrates a fuel system 20 for an engine 22. The engine 22 may be, for example but not limited to, a gas turbine engine utilized for propulsion of an aircraft, a gas turbine engine utilized as an auxiliary power unit (APU), or other system.

The fuel system 20 generally includes a main pump 24 to supply fuel from a relatively low pressure fuel source 26 through an Ice and Debris Separator (IDS) 28 to a fuel subsystem 30 thence to a fuel manifold 32 in a combustor section 34 of the engine 22. The fuel subsystem 30 may include various components such as fuel modules, high-pressure pumps, solenoid valves, metering valves, shut-off valves, spill valves, and other filters. It should be appreciated that various other, systems, subsystems and calibrated fuel system components may alternatively or additionally be provided and are contemplated as included in the representative fuel subsystem 30.

The IDS 28 may also be immediately upstream of a heat exchanger 36 that is optionally employed within the fuel system 20. It should be appreciated that the heat exchanger 36 may be directly associated with the engine 22 and/or distributed elsewhere in the larger system 20. The heat exchanger 36 may alternatively or additionally include a multiple of heat exchangers distributed throughout the system.

With reference to FIG. 2, the IDS 28 in the disclosed non-limiting embodiment provides ice and debris separation and is referred to herein as an ice and debris separator (IDS). A fuel conduit 38, typically approximately 0.25" (6 mm) in diameter, communicates with a container 40 at an inlet 42. The container 40 also includes an outlet 44.

The container 40 includes a relatively large surface area filter screen 46 that is transverse to the inlet 42. The container 40 and the filter screen 46 may be generally cylindrical. In one disclosed non-limiting embodiment, the filter screen 46 provides a pressure drop of less than 0.5 psi and prevents passage of particles greater in size than, for example, between 40 to 6000 microns and in particular, 1500 microns.

Furthermore, even if the filter screen 46 should be completely blocked by ice—a rare occurrence—the filter screen 46 is bypassed via a filter screen bypass inlet 48 to define tortuous path T (illustrated schematically). Fuel may thereby pass through the filter screen 46 during normal operations but will form a tortuous path T and facilitate segregation of the outlet 44 even if the filter screen 46 becomes blocked or frozen over. That is, as water and ice are both heavier than jet fuel, the tortuous path alone facilitates separation of the water and ice from the jet fuel.

With reference to FIG. 3, another disclosed non-limiting embodiment locates the outlet 44 parallel to the inlet 42 and through a side 50 of the container 40. In one disclosed non-limiting embodiment, the container 40 locates the filter screen 46 transverse to the inlet 42 to provide a tortuous path. It should be appreciated that various inlet an outlet arrangements to provide a tortuous path may alternatively or additionally be provided. Furthermore, other torturous paths such as a vertical filter screen with a screen ledge at the top protruding radially that forces the debris to change path would alternatively or additionally be utilized herewith.

With reference to FIG. 4, another disclosed non-limiting embodiment locates the outlet 44 parallel to the inlet 42 through the bottom 52 of the container 40. The outlet 44 and the filter screen 46 are defined along a common axis A with the inlet offset therefrom. That is, the higher the velocity at which the fuel flows, the fuel essentially scours against the filter screen 46 at the point that it enters the container 40 such that even in a potential icing condition, the potential for the filter screen 46 to ice is further defended against through the action of the fuel. This tortuous path removes the need for the fast moving fuel stream to make a sharp turn and creates a scouring effect across the filter screen 46 which combats icing in the localized areas which facilitates yet another aspect of icing defense.

With reference to FIG. 5, another disclosed non-limiting embodiment locates the filter screen 46-1 at an angle to form a trapezoidal-like cross section. As the filter screen 46-1 is angled toward the inlet 42 a more acute tortuous path T-1 is thereby provided. It should be appreciated that various transverse arrangements at various angles may alternatively or additionally be provided.

Figure 6:
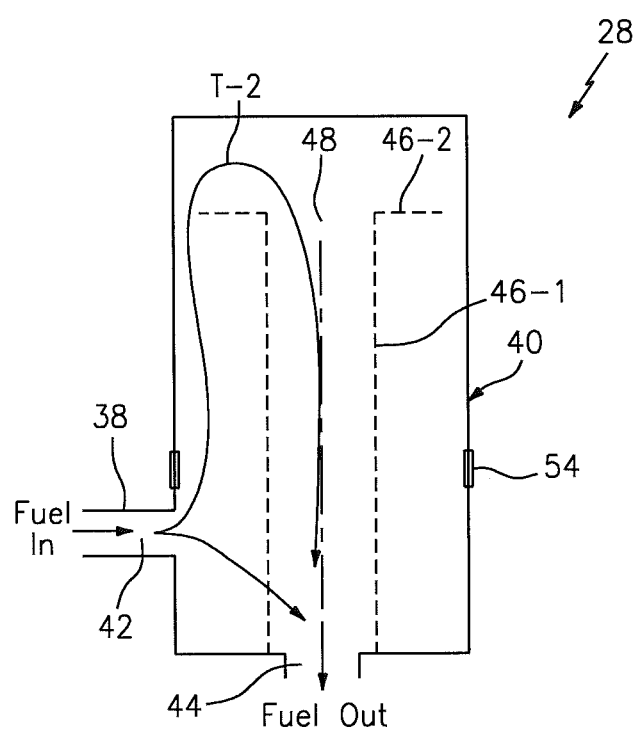
FIG. 6 is an enlarged schematic sectional view of a filter according to another disclosed non-limiting embodiment.

With reference to FIG. 6, another disclosed non-limiting embodiment provides a transverse filter screen section 46-2 transverse to the filter screen 46-1 to form an inverted "top hat" like filter screen cross-section to provide a yet more acute tortuous path T-2. It should be appreciated that various transverse arrangements at various angles may alternatively or additionally be provided.

The container 40 collects ice and debris. Over time, the ice will eventually melt in the container and be communicated out of the container through the filter screen 46. Debris may eventually be removed in normal maintenance operations by disassembly of the container at an interface 54 such as a threaded interface.

The IDS provides a defense to ice and large debris upstream of the calibrated fuel system components. The IDS incorporates the advantages of a filter screen without the potential of icing and/or pressure drop. The IDS incorporates the advantages of a screenless filter (which relies on geometry) without the potential of large slow moving debris working through the geometry. The IDS also incorporates the advantages of a fully screened ice separator (with no path around the screen) without the risk of fuel starvation should the filter screen ever become iced over. The IDS also has but a relatively small pressure drop.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as) specifically described. For that reason the appended claims should be studied to determine true scope and content.

What is claimed is:

1. A filter comprising:
    a container that includes a first surface and a second surface opposed to said first surface;
    an inlet to said container located in said first surface;
    an outlet from said container located in said second surface; and
    a filter screen within said container that partially surrounds said outlet,
    wherein said filter screen defines a tortuous path between fuel entering said inlet and fuel exiting said outlet,
    wherein said inlet is parallel to said outlet,
    wherein said filter screen and said outlet are defined along a common axis, said inlet offset from said axis, and wherein at least, a portion of said fuel entering said inlet circumvents said filter screen and is included in said fuel exiting said outlet.

2. The filter as recited in claim 1, wherein said filter screen prevents passage of particles greater in size than 40 microns.

3. The filter as recited in claim 1, wherein said filter screen provides a pressure drop of less than 0.5 psi.

4. The filter as recited in claim 1, wherein said filter screen is cylindrical and extends parallel to a length of said container.

5. The filter as recited in claim 1, wherein said filter screen extends non-parallel to a length of said container.

6. A system comprising:
   a container that includes a first surface and a second surface opposed to said first surface;
   an inlet to said container located in said first surface;
   a conduit that communicates fuel to said container at said inlet;
   an outlet from said container located in said second surface; and
   a filter screen within said container that partially surrounds said outlet,
   wherein said inlet is parallel to said outlet,
   wherein said filter screen and said outlet are defined along a common axis, said inlet offset from said axis, and
   wherein at least a portion of said fuel circumvents said filter screen and exits said container at said outlet.

7. The system as recited in claim 6, wherein said filter screen extends parallel to a length of said container.

8. The system as recited in claim 6, wherein said filter screen extends non-parallel to a length of said container.

9. A filter comprising:
   a container that includes a first surface and a second surface opposed to said first surface;
   an inlet to said container located in said first surface;
   an outlet from said container, said outlet parallel to said inlet and located in said second surface; and
   a filter screen within said container that partially surrounds said outlet,
   wherein said filter screen and said outlet are defined along a common axis, said inlet offset from said axis, and
   wherein at least a portion of fuel that enters said container at said inlet circumvents said filter screen and exits said container at said outlet.

10. The filter as recited in claim 9, wherein said inlet and said filter screen are arranged such that fuel that enters said inlet scours against said filter screen at a point that said fuel enters said container.

11. The filter as recited in claim 1, wherein said inlet and said filter screen are arranged such that said fuel scours against said filter screen at a point that said fuel enters said container.

12. The system as recited in claim 6, wherein said inlet and said filter screen are arranged such that said fuel scours against said filter screen at a point that said fuel enters said container.

13. The system as recited in claim 6, wherein said at least a portion of said fuel circumvents said filter screen and exits said container at said outlet when ice clogs said filter screen.

14. The filter as recited in claim 1, wherein said first surface is a top surface of said container and said second surface is a bottom surface of said container.

15. The system as recited in claim 6, wherein said first surface is a top surface of said container and said second surface is a bottom surface of said container.

16. The filter as recited in claim 9, wherein said first surface is a top surface of said container and said second surface is a bottom surface of said container.

17. The filter as recited in claim 1, wherein said at least a portion of said fuel circumvents said filter screen and exits said container at said outlet when ice clogs said filter screen.

18. The filter as recited in claim 9, wherein said at least a portion of fuel circumvents said filter screen and exits said container at said outlet when ice clogs said filter screen.

\* \* \* \* \*